INVENTOR.
LLOYD D. MASSER

June 16, 1964  L. D. MASSER  3,137,515
FIFTH WHEEL STRUCTURE
Filed April 16, 1962  3 Sheets-Sheet 2
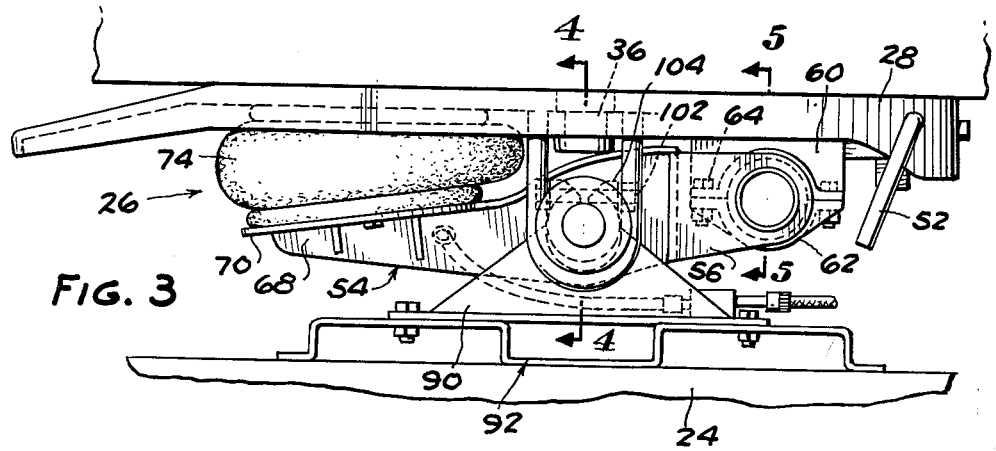
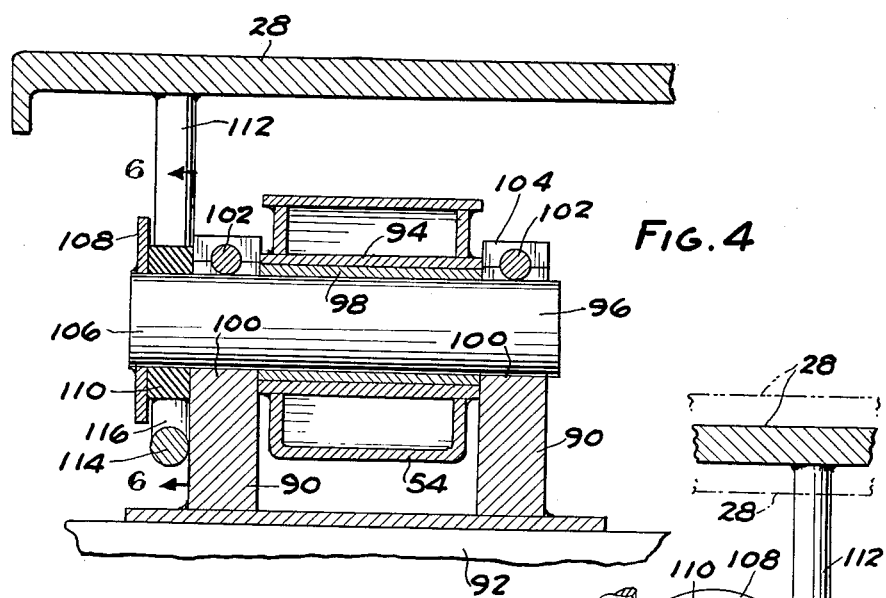
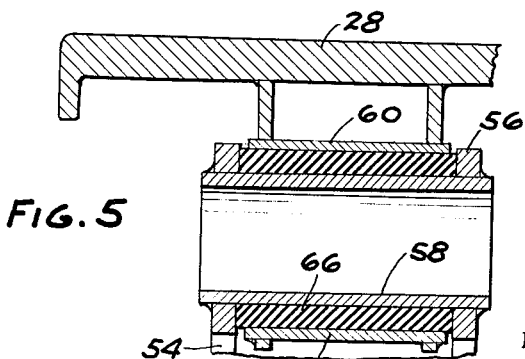
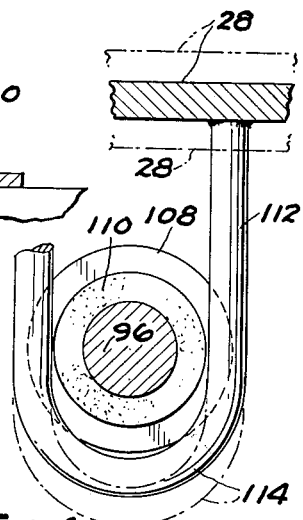
INVENTOR.
LLOYD D. MASSER
BY
Barnes, Kisselle, Raisch & Choate
ATTORNEYS June 16, 1964                L. D. MASSER                3,137,515
                           FIFTH WHEEL STRUCTURE
Filed April 16, 1962                                3 Sheets-Sheet 3

INVENTOR.
LLOYD D. MASSER
BY
Barnes, Kisselle, Raisch & Choate
ATTORNEYS

United States Patent Office 3,137,515
Patented June 16, 1964

3,137,515
FIFTH WHEEL STRUCTURE
Lloyd D. Masser, Muskegon, Mich., assignor to Neway Equipment Company, Muskegon, Mich., a corporation of Michigan
Filed Apr. 16, 1962, Ser. No. 187,803
12 Claims. (Cl. 280—440)

This invention relates to fifth wheels of the type used to detachably couple the forward end of a semi-trailer to a tractor. During coupling of a trailer and tractor, the parts of a conventional fifth wheel are subject to impact loading. Also, during road use, shock is transmitted between the trailer and tractor through relatively rigid fifth wheel parts. These characteristics cause relatively rapid wear on the fifth wheel mechanism and result in a notoriously rough and fatiguing ride for the tractor operator. Some conventional fifth wheels incorporate rubber bushings or mountings of one type or another to absorb some of the shock during coupling and road use, but this does not satisfactorily solve the problem.

Heretofore, attempts have been made to incorporate a spring arrangement into a fifth wheel to alleviate these conditions, but the resulting structures have been generally unsatisfactory either because of cost and complexity or because of undesirable operating characteristics. Moreover, such spring arrangements take up space and limit the angle to which the rockable fifth wheel plate can swing when uncoupled. The resulting relatively mild slope decreases the height of the ramp provided by the rockable fifth wheel plate and complicates recoupling since the fifth wheel plates must be more accurately vertically aligned.

The object of this invention is to provide a relatively simple, inexpensive fifth wheel structure which incorporates a spring arrangement improved to absorb both coupling impacts and shocks incidental to road use, which will function as a conventional fifth wheel if the spring arrangement should fail, and which is adapted to provide a relatively large ramp angle when uncoupled.

The invention generally contemplates supporting one of the fifth wheel plates by a lever arrangement. One end of the lever is pivoted onto the fifth wheel while the other end is free to swing vertically. The springs are interposed between the fifth wheel and the free lever end. The central portion of the lever is fulcrumed onto the vehicle frame or the like. The advantages of this structure, as well as other novel structural features, are discussed in the detail description. When air springs and a height control valve are used, the springs are arranged to deflate automatically when the wheel is uncoupled, thereby increasing its ramp angle, and to inflate automatically to the proper height when the wheel is recoupled. In the drawings:

FIG. 3 is a generally side elevational view of a fifth wheel according to this invention in use.

FIG. 4 is an enlarged fragmentary sectional view on line 4—4 of FIG. 3.

FIG. 5 is an enlarged fragmentary sectional view on line 5—5 of FIG. 3.

FIG. 6 is a fragmentary generally sectional view on line 6—6 of FIG. 4.

Figure 1:
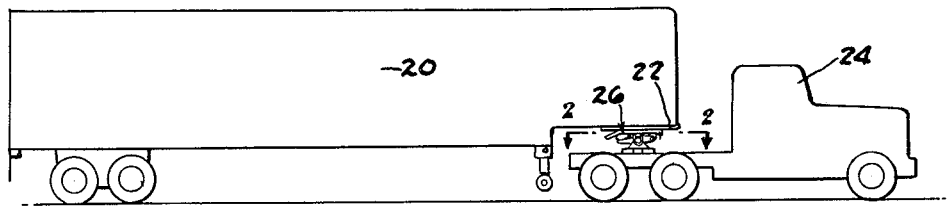
FIG. 1 is a diagrammatic side elevational view of a tractor and semi-trailer coupled through a fifth wheel according to this invention.
Figure 2:
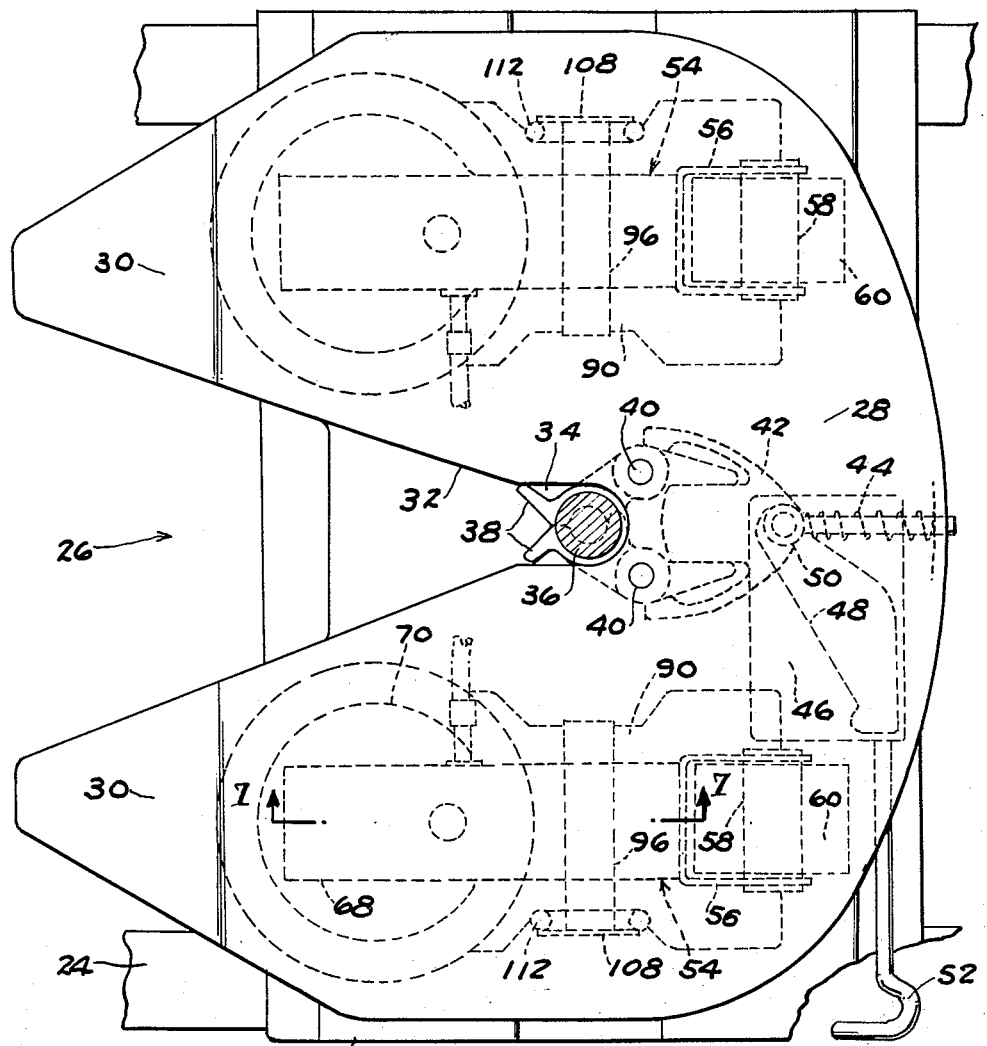
FIG. 2 is a greatly enlarged view on line 2—2 of FIG. 1 with parts shown in phantom to illustrate structure.

Shown in FIG. 1 is a semi-trailer 20 having an upper fifth wheel plate 22 coupled to a tractor 24 through a fifth wheel structure 26 embodying this invention. The fifth wheel structure includes a lower fifth wheel plate 28 having rear tail ramps 30 flanking a forwardly convergent throat 32 which terminates in a socket 34 for receiving a king-pin 36 which depends from upper fifth wheel plate 22. The king-pin is releasably retained within socket 34 by locking jaws 38 pivotally mounted at 40 to the underside of plate 28. Jaws 38 are, in turn, releasably locked in place by a locking yoke 42 retractable to the right as FIG. 2 is viewed against the action of a spring 44 by movement upward as FIG. 2 is viewed of a slide plate 46 having a cam slot 48 engaged with a follower 50 on yoke 42. Plate 46 is operated by a handle 52, and when the handle is shifted outwardly, yoke 42 again advances for locking jaws 38 in clamped position. This much of the fifth wheel structure is conventional.

A pair of laterally spaced, longitudinally extending levers 54 are pivotally mounted to the underside of fifth wheel 28, and these levers provide means for transmitting load between plate 28 and the frame of tractor 24. Each lever has a bifurcate forward end portion 56 which carries a tubular pivot shaft 58 clamped to a bracket 60 depending from the underside of plate 28 by a cap 62 and bolts 64 (FIG. 3). A torsion rubber bushing 66 is disposed between shaft 58 and the clamp provided by bracket 60 and cap 62.

Figure 7:
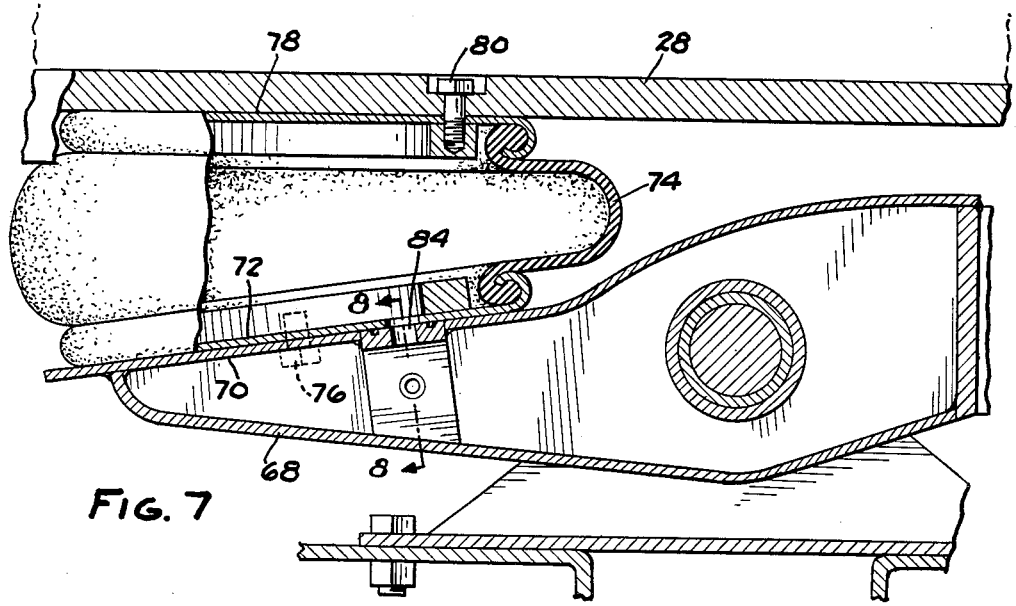
FIG. 7 is an enlarged fragmentary generally sectional view on line 7—7 of FIG. 2 with parts shown in elevation to illustrate structure.
Figure 8:
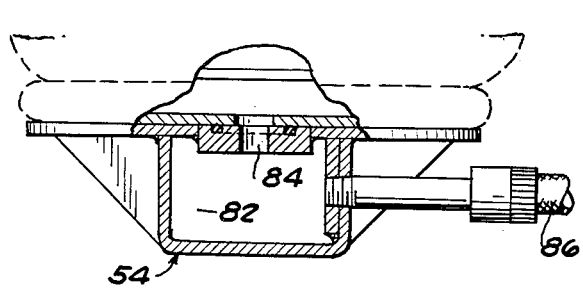
FIG. 8 is a fragmentary sectional view on line 8—8 of FIG. 7.
Figure 9:
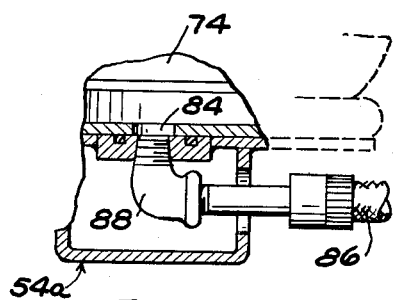
FIG. 9 is a view similar to FIG. 8 but showing a modified structure.

Each lever 54 has a free rearward end portion 68 with an upper enlarged area 70 providing a platform to which one end plate 72 of an air bag type spring 74 is anchored by suitable means such as bolting 76 (FIG. 7). The opposite end plate 78 of the air bag is secured to the underside of fifth wheel plate 28 as by bolting 80. In the structure shown in FIGS. 7 and 8, each lever 54 has a hollow interior providing an air chamber 82 communicating to the interior of bag 74 through an opening 84, air being supplied to the chamber through an air line 86. In FIG. 9, levers 54a do not provide air chambers. Compressed air is provided to the interior of bag 74 directly through a fitting 88 interconnecting opening 84 and air line 86.

An intermediate portion of each lever 54 is rockably mounted on blocks 90 supported by cross framing 92 anchored on trailer frame 24. For this purpose, each lever 54 is provided with a fulcrum member such as a lateral tube 94 rockably supported on a trunnion shaft 96 through a sleeve bearing 98. Shaft 96 forms the other member of the fulcrum and is clamped within openings 100 in blocks 90 by bolts 102 which pass through projections 104 at the top of blocks 90 to squeeze openings 100 about shaft 96 (FIGS. 3 and 4).

One end 106 of each shaft 96 projects outwardly of its outer block 90 and terminates in a flange 108 which cooperates with the adjacent block 90 to contain a rubber washer or bumper 110. A U-shaped tie 112 depends from each side of fifth wheel plate 28, and its lower bight portion 114 encircles bumper 110. Bight 114 can move vertically within space 116 between flange 108 and the outer support block 90. Ties 112 limit swinging movement of levers 54 and fifth wheel plate 28 away from each other under the impetus of springs 74.

As with conventional fifth wheels, this one could be mounted in inverted position beneath the forward end of a semi-trailer if desired. The invention is not limited to the use of air springs 74 but contemplates the use of other types of springs as well.

In use, it may be assumed that initially semi-trailer 20 is coupled to tractor 24 through fifth wheel 26. Load of the semi-trailer is transmitted downwardly from fifth wheel plate 28 to levers 54 through both springs 74 and the pivots or fulcrums provided at the forward ends of the levers by shaft 58 and clamps 60, 62. The pivots and load centers of the springs are positioned so that load is transmitted generally equally therethrough to the levers and their fulcrum shafts 96. The forward pivots of levers 54 are laterally substantially rigid to confine the levers to swinging paths of movement toward and away from plate 28 despite the lack of lateral stability of air springs 74.

In passing over bumps or irregularities during road use, the forward end of the semi-trailer will tend to shift up and down relative to the tractor frame. Springs 74 will compress and extend responsive to this action. When the load increases and spring 74 is compressed, the rearward ends 68 of the levers will swing upwardly and the forward ends 50 of the levers will rock downwardly about trunnions 96. During this movement, the entire fifth wheel plate 28 will drop uniformly downwardly. When the unusual load is relieved, springs 74 will recover, thereby forcing the fifth wheel and lever ends 68 apart and rocking the forward ends 50 of the levers upwardly. Consequently, fifth wheel plate 28 will move upwardly while tending to remain level.

Similarly, when the forward end of the semi-trailer tends to bounce upwardly, fifth wheel plate 28 will shift upwardly in a generally level condition; and when the semi-trailer settles back, plate 28 will again return downwardly while tending to remain level. Thus, the structure provides a springing action for vertical forces transmitted between the semi-trailer and tractor during road use.

Ties 112, by engagement with bumpers 110, limit relative swinging of the fifth wheel plate and levers away from each other under extreme bouncing movements of the vehicle and bumper 110 resiliently absorbs impacts between bight 114 and fulcrum shaft 96 in this event.

It will be observed from FIGS. 3 and 7 that the upper rearward end portion 70 of each lever slopes downwardly with the result that under normal running conditions, air bag 74 is squeezed to a wedge shape. Upon unusual loading on the fifth wheel, such as when the vehicle traverses severe bumps, when the rearward ends of the levers swing upwardly, platforms 70 approach parallel relation to fifth wheel plate 28, thereby minimizing the possibility of pinching the air bag and puncturing it.

The shock of horizontal impacts between king-pin 36 and its socket 34 and jaws 38 during road use are partially absorbed by rubber bushings 66 at the forward ends 50 of the levers. Moreover, springs 74 also assist in absorbing horizontal transmitted shocks since forward or rearward force exerted by king-pin 36 on plate 28 will tend to rock the entire fifth wheel structure about fulcrum 96, and this will be attended by relative swinging movement of plate 28 and rearward ends 68 of the levers. As pointed out above, it is this relative movement which provides the springing action.

Rubber bushings 66 are bonded mechanically to support clamps 60, 62 and to shaft 58. These bushings thus provide torsion members which tend to resist swinging movements of arms 54. From time to time, such as when the vehicle is traversing rough ground, there are forces exerted on fifth wheel plate 28 which tend to tilt it. An advantage of the present structure is that torsion bushings 66 will yield somewhat to such forces so that no undue stress is imposed on any part of the mechanism. At the same time, however, the torsion bushings strongly resist rocking of arms 54 relative to each other and thus provide adequate support for restraining plate 28 and the semi-trailer in an upright position.

The air to springs 74 can be controlled by a single valve or a separate valve can be provided for each spring. In the latter case, if one spring should fail, the torsional resistance of bushings 66 to unlike rocking of arms 54 is adequate to maintain the semi-trailer in an upright position so that the vehicle can continue to be used. In any event, if both springs 74 should for some reason fail, fifth wheel plate 28 merely lowers until the rearward ends 68 of levers 54 or the fifth wheel plate bottom against a rubber bumper structure (not shown) conventionally contained within air springs 74. The entire unit continues to function as a conventional fifth wheel.

When the semi-trailer is uncoupled from the tractor, levers 54, fifth wheel plate 28, and springs 74 swing bodily about trunnion 96 so that the entire assembly is manipulable in the manner of a conventional fifth wheel to facilitate coupling and uncoupling operations.

In uncoupled condition, the rearward end of the fifth wheel assembly swings downwardly in the manner of a conventional fifth wheel. To couple the trailer to the tractor, the fifth wheel plate 22 is merely run up ramps 30 and the king-pin 36 engaged within socket 34 and locked there by jaws 38 in the manner described. It is during this coupling operation that the fifth wheel structure is subjected to its most severe treatment. This occurs when upper plate 22 engages ramp 30 and when the king-pin slams against the forward end of socket 34.

In the first phase, when plate 22 hits ramps 30, springs 74 will provide a direct springing action to absorb the force of the resulting impact. When the king-pin strikes the forward end of socket 34, it will tend to rotate plate 28 forwardly, and this will effect scissoring together of the rearward end of the fifth wheel plate and lever ends 68 to provide the spring action described above.

Figure 10:
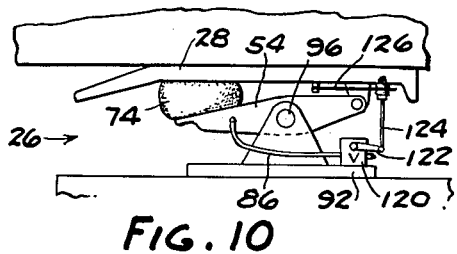
FIG. 10 is a diagrammatic side elevation illustrating the fifth wheel used with a height control valve.
Figure 11:
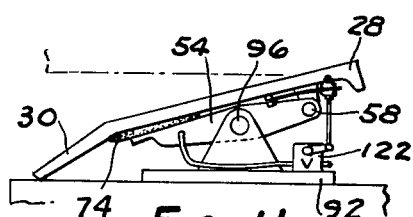
FIG. 11 is a view similar to FIG. 10 but showing the relation of the parts in uncoupled condition of the wheel.

FIGS. 10 and 11 illustrate a fifth wheel 26 according to this invention used in conjunction with a conventional height control valve 120 interposed in air line 86 and mounted on a stationary part of tractor 24 such as support 92. Valve 120 is controlled by linkage including a conventional control arm 122 and rod 124, the latter being connected to a portion of fifth wheel plate 28 forward of pivot shaft 96 through a conventional leaf spring arrangement 126.

With this arrangement when relatively heavy loads are imposed on the fifth wheel and it moves downwardly in the manner described, valve 120 is actuated to introduce more air into air springs 74 for restoring the desired height of fifth wheel plate 28. When load is relieved, plate 28 moves upwardly and valve 120 is actuated to exhaust air from springs 74 until the proper height is restored. Conventional mechanism (not shown) may be provided in connection with valve 120 to damp out the effect of momentary vertical oscillations of plate 28 which otherwise might cause undesired operation of the valve.

When trailer 20 is uncoupled from tractor 24, the tail-heavy fifth wheel structure as a whole rocks downwardly in the manner described. This movement causes valve 120 to dump the air from springs 74 so that the rearward end portions or ramps 30 of the fifth wheel plate rock downwardly about pivots 58. Springs 74 collapse as illustrated in FIG. 11 and the repose angle of ramps 30 is increased to about the same angle which they would have if no spring structure were present at all. Thus, in a subsequent uncoupling operation, the forward end of trailer 20 can have a relatively wide range of heights and will still couple with fifth wheel 26 when the tractor is backed under it.

When the parts are in the FIG. 11 position, fifth wheel plate 28 is nearly but not quite bottomed with respect to a conventional rubber bumper structure (not shown) contained within springs 74. The torsion rubber bushings 66 hold the fifth wheel plate somewhat out of engagement with the bumper structure.

In the recoupling operation, fifth wheel plate 28 is first swung downwardly against the force of torsion bushings 66 and this absorbs some of the coupling energy. Next the plate bottoms with respect to the rubber bumper structure contained in springs 74 and this absorbs more of the coupling energy. Finally, when the king-pin strikes home, the entire structure acts resiliently in the manner described above to absorb still more of the coupling energy. In this situation, however, the spring action is provided by bushings 66 and the bumper structure in springs 74 since the latter are not yet re-inflated.

When fifth wheel plate 28 rocks from the FIG. 11 position to the FIG. 10 position during the coupling procedure, valve 120 is operated to introduce air into springs 74 until fifth wheel plate 28 elevates to the desired adjusted position whereupon valve 120 closes. Subsequently, plate 28 is maintained at the desired height by the valve as described.

I claim:
1. Fifth wheel structure comprising,
a fifth wheel member adapted for coupling with a fifth wheel element on a semi-trailer or the like,
support means, means providing a pivotal load-transmitting connection between said support means and a fifth wheel member so that portions of said support means and member can swing toward and away from each other,
load-transmitting spring means interposed between said portions of said support means and member,
said spring means providing resilient resistance to movement of said portions of said support means and member toward each other,
means limiting movement of said portions of said support means and member away from each other,
said support means including means adapted to be connected in rockable load-transmitting relation on a tractor frame or the like,
the latter-said means being oriented to receive load transmitted both by said pivotal connection and said spring means.

2. Fifth wheel structure comprising,
a fifth wheel member adapted for coupling with a fifth wheel element on a semi-trailer or the like,
means forming a pair of levers, each having a fulcrum connection with said fifth wheel member, each lever having a portion which can be swung about said fulcrum connection toward and away from a portion of said fifth wheel member,
spring means interposed in resilient, load-transmitting relation between said lever portions and member portions,
each of said levers including a fulcrum member adapted to be connected in rockable, load-transmitting relation to a tractor frame or the like,
each of said fulcrum members being oriented to receive load transmitted by both said spring means and said fulcrum connection of its respective lever,
and torsion means associated with said fulcrum connections, said torsion means being operable to provide resistance to rocking of said levers relative to each other.

3. Fifth wheel structure comprising,
a fifth wheel member adapted for coupling with a fifth wheel element on a semi-trailer or the like,
a pair of levers, each having an end portion with a fulcrum connection to said fifth wheel member,
said levers extending away from their fulcrum connections in a direction longitudinal of a semi-trailer or the like with which said fifth wheel structure is adapted to be used,
each lever having a free end portion which is swingable about its fulcrum connection toward and away from said fifth wheel member,
a spring interposed in resilient, load-transmitting relation between each of said free end portions and said fifth wheel member,
said springs providing yieldable resistance to movement of said free end portions toward said fifth wheel member,
each of said levers including a fulcrum member adapted to be connected in rockable load-transmitting relation to a tractor frame or the like, said fulcrum members being disposed at a location longitudinally intermediate said fulcrum connections and the load centers of said springs on said free end portions,
said fulcrum connections between said levers and fifth wheel member being substantially coaxial,
and each of said fulcrum connections including torsion means which provide yieldable resistance to rocking movement of said levers relative to each other.

4. Fifth wheel structure comprising,
a fifth wheel member adapted for coupling with a fifth wheel element on a semi-trailer or the like,
a pair of levers, each having a fulcrum connection to said fifth wheel member,
said fulcrums being substantially coaxial and generally laterally rigid to confine relative swinging movement of said levers and fifth wheel member to a path toward and away from each other,
torsion means associated with said fulcrums and providing yieldable resistance to relative rocking of said levers,
spring means disposed in resilient load-transmitting relation between relatively swingable portions of said levers and fifth wheel member, said spring means being of itself generally devoid of lateral stability,
said levers including means adapted to be connected in rockable, load-transmitting relation on a tractor frame or the like,
the latter-said means being oriented to receive load transmitted both by said fulcrum and said spring means.

5. Fifth wheel structure comprising,
a fifth wheel member adapted for coupling with a fifth wheel element on a semi-trailer or the like,
a pair of levers, each lever having a torsion rubber bushed fulcrum connection to said fifth wheel member,
said fulcrum connections being substantially coaxial,
said torsion rubber providing yieldable resistance to relative rocking movement of said levers, said torsion rubber also being operable to confine relative swinging movement of said levers and fifth wheel member substantially to a path toward and away from each other,
spring means interposed between each of said levers and said fifth wheel member, said spring means comprising an air bag or the like having of itself substantially insignificant lateral stability,
each of said levers including a fulcrum member adapted to be connected in rockable load-transmitting relation to a tractor frame or the like, said fulcrum member of each lever being disposed at a location between said fulcrum connection and the load center of said spring means on said lever.

6. Fifth wheel structure comprising,
a fifth wheel member adapted for coupling with a fifth wheel element on a semi-trailer or the like,
a pair of levers, each lever having an end portion connected to said fifth wheel member through a torsion rubber bushed fulcrum,
each lever extending away from its fulcrum in a direction longitudinal of a semi-trailer or the like with which said fifth wheel structure is adapted to be used,
each lever having a free end portion swingable toward and away from each fifth wheel member about its fulcrum,
a spring disposed in resilient load-transmitting relation between each of said free end portions and said fifth wheel member,
the torsion rubber providing yieldable resistance to rocking of said levers relative to each other, said rubber also being operable to confine movement of said levers generally in a path directly toward and away from said fifth wheel, each of said levers having means providing a second fulcrum member adapted to be connected in rockable load-transmitting relation to a tractor frame or the like, each of said second fulcrum members being disposed at a location longitudinally between the load center of its respective spring and its fulcrum connection to said fifth wheel member.

7. Fifth wheel structure comprising, a fifth wheel member and means providing a support, a load-transmitting connection between said member and support which facilitates swinging of said member and support toward and away from each other, air pressure spring means operably interposed between the portions of the support and member which swing toward and away from each other, said support including means adapted to be rockably mounted on a vehicle on which said fifth wheel is adapted to be used, valve means operable to control the air pressure in said spring means, actuating mechanism operable to actuate said valve responsive to vertical movement of said member in coupled condition relative to a vehicle for controlling the height of said member, said fifth wheel structure being unbalanced relative to its rockable mount for rocking said member to an angled position of repose when in uncoupled condition, said actuating mechanism being operative responsive to said rocking to actuate said valve means for relieving pressure in said spring means so that the same can collapse for increasing said angle of repose, said mechanism being operable responsive to counter-rocking of said fifth wheel structure upon recoupling thereof to actuate said valve for re-extending said spring means.

8. The combination defined in claim 7 wherein said fifth wheel member has a portion extending to one side of said pivotal mount which includes ramp means disposed at said angle of repose in uncoupled condition, said fifth wheel member having another portion extending to the opposite side of said rockable mount, said actuating means being operable responsive to movement of the latter-said portion to actuate said valve means in the manner described.

9. The combination defined in claim 7 wherein said fifth wheel member has portions extending on both sides of said rockable mount, said valve actuating mechanism including linkage having an operative connection with a portion of said member on one side of said mount.

10. Fifth wheel structure comprising, a fifth wheel member having means adapted to be rockably mounted on a vehicle, air pressure spring means operable to resiliently support portions of said fifth wheel member which rock relative to said mount, valve means operable to control the air pressure in said spring means, actuating mechanism operable to actuate said valve responsive to vertical movement of said member in coupled condition relative to a vehicle, said member being shiftable in a generally vertical direction responsive to pressure variations in said spring means, said fifth wheel structure being unbalanced relative to its rockable mount for rocking of said member to an angled position of repose when in uncoupled condition, said actuating mechanism being operative responsive to said rocking to actuate said valve means for relieving pressure in said spring means so that the same can collapse, said mechanism being operable responsive to counter-rocking of said fifth wheel member upon recoupling thereof to actuate said valve for re-extending said spring means.

11. Fifth wheel structure comprising, a fifth wheel member adapted for coupling with a fifth wheel element on a semi-trailer or the like, support means, means forming a load-transmitting connection between said support means and fifth wheel member through which portions of said support means and member can swing toward and away from each other, spring means in resilient load-transmitting relation between said portions of said support means and member, said support means including means adapted to be connected in rockable load-transmitting relation on a tractor frame or the like, said load-transmitting connection and said spring means transmitting load to said support means at locations which are spaced apart longitudinally of said semi-trailer, said means included by said support means being disposed longitudinally at a location between the first-mentioned locations for receiving load transmitted both by said load-transmitting connection and said spring means.

12. Fifth wheel structure comprising, a fifth wheel member adapted for coupling with a fifth wheel element on a semi-trailer or the like, lever means, means forming a fulcrum connection between said lever means and fifth wheel member through which portions of said lever means and member can swing toward and away from each other, spring means interposed in resilient load-transmitting relation between said portions of said lever means and member, said lever means providing a fulcrum member adapted to be connected in rockable, load-transmitting relation to a tractor frame or the like, said fulcrum connection and said spring means transmitting load to said lever means at locations which are spaced apart longitudinally of said semi-trailer, said fulcrum member being disposed longitudinally at a location between the first-mentioned locations for receiving load transmitted both by said fulcrum connection and said spring means.

References Cited in the file of this patent

UNITED STATES PATENTS

| | | |
|---|---|---|
| 2,391,372 | Weigand | Dec. 18, 1945 |
| 2,507,616 | Stephen | May 16, 1950 |
| 2,733,931 | Reid et al. | Feb. 7, 1956 |
| 2,821,409 | Chalmers | Jan. 28, 1958 |
| 2,996,312 | Paul | Aug. 15, 1961 |